*J. Marsden,*

Loom.

No. 92,856.   Patented July 20, 1869.

11 Sheets, Sheet 8.

FIG. 6.

Separate View of one of the Latch Levers U.

J. Marsden.
Loom.
No. 92,856. Patented July 20, 1869.

11 Sheets, Sheet 10.

Witnesses
John Marsden

United States Patent Office.

JOHN MARSDEN, OF HALIFAX, ENGLAND, ASSIGNOR TO JOHN CROSSLEY AND SIR FRANCIS CROSSLEY, OF SAME PLACE.

Letters Patent No. 92,856, dated July 20, 1869; patented in England, September 9, 1867.

IMPROVEMENT IN LOOM FOR WEAVING CARPETS.

The Schedule referred to in these Letters Patent and making part of the same.

*To all to whom it may concern:*

Be it known that I, JOHN MARSDEN, of Halifax, in the county of York, England, mechanic, a subject of the Queen of Great Britain, have invented or discovered new and useful "Improvements in Looms for Weaving Scotch or Ingrain Carpets;" and I, the said JOHN MARSDEN, do hereby declare the nature of the said invention, and in what manner the same is to be performed, to be particularly described and ascertained in and by the following statement thereof; that is to say—

First, my improvements consist in obtaining a dwell to the batten during the throw of the shuttle, by causing the crank to work in a curved slot formed in the connecting-rod or arm, one end of the rod or arm being attached to the lathe-sword, and the other end working in an oscillating guide.

Secondly, my improvements consist in a new combination and arrangement for working the shuttle-boxes, and effecting the necessary changes required for the throwing in the different-colored wefts. A series of shuttle-boxes is arranged on each side of the loom, so as to work in a horizontal position in slides attached to the loom-frame. To the under side of each series of boxes is attached a toothed rack, gearing into a pinion fixed to the same axis as the change or stud-wheel, the pins or studs of which are laid hold of by one of two catch-levers selected by the jacquard, and according as one or other of these levers is brought into action, the change-wheel is turned in one direction or the other, and a change of boxes takes place. The two catch-levers are on each side of the loom, carried by a sliding frame, working horizontally on fixed bars, and receiving motion from a crank-arm attached to the driving-shaft by a spring-clutch box. A pulley from the crank-arm works in a curved slot in the sliding frame, the motion of which, and of the catch-levers, is thus intermittent. A small connecting-rod, placed between the two catch-levers, keeps them the required distance apart, so as to prevent their both acting at the same time; and the levers themselves are so shaped that during their return movement, after a change of boxes, their inclined slides coming into contact with the pins of the change-wheel, bring the levers again into their normal position, where they are retained by a latch-spring, fitting into a suitable recess in a small arm, connected, by intermediate apparatus, with the catch-levers. The small arm is provided, also, with other two similar recesses, one on each side of the first, so as to retain the catches in proper position for acting on the stud-wheel, when either of them is selected by the jacquard. The two rods from the jacquard, for selecting the catch-levers, are each formed in two parts, connected together by a spring, so that in case the jacquard were to get wrong, and both rods were to act together, no breakage would occur. In order to prevent the pin-wheel or shuttle-boxes from moving too far during the respective changes, each series of boxes is provided with a slotted bar, into the recesses of which a latch-bar is caused to rise, by means of a spring, whenever a change of boxes takes place. The clutch-box of the crank-arm which works the two catch-levers, is provided with a lever and spring, to keep the two parts of the clutch together, but so as to give way, to prevent breakage when the shuttle fails to box properly. To each of the two clutch-levers is attached one end of a connecting-rod, the other ends of which are fixed to a double bell-crank or ⌊-shaped lever, in connection with the stop-motion, so that if the parts of the clutch-box at either side of the loom become disengaged, the loom is instantly stopped.

Thirdly, my improvements consist in additional means for preventing damage to the shuttle when the latter fails to enter the box, and consists in cutting away that part of the lathe-sword which usually projects above the shuttle-race, and to which the hand-rail is ordinarily fixed. According to my improvement, the hand-rail is supported by a stud, fixed at some distance to the back or front part of the shuttle-race; and an adjustable guide-plate serves to guide the shuttle, after leaving the shed, fairly into its box, while a finger carried by the lathe-sword brings up the weft to the fell of the cloth, to form a good selvage, but this finger is so arranged as to give way in case it comes in contact with the shuttle.

Fourthly, my improvements relate to the picking-motion, and consist of what I term a double clutch-box, working as follows: The picker-stick is fixed to a small lever-arm, the boss of which is mounted loosely on the top of the picking-shaft. The upper surface of this boss is recessed out, in the form of a square or other suitable form, and the end of the picking-shaft, which is also made square, projects into this recess. The other part of the clutch-box consists of a lid or cap, having on its under surface a square projection, the outside of which fits into the square recess of the boss, and the inner part of which projection is itself recessed, so as to fit on to the square end of the picking-shaft. When the three parts of the clutch are together, the motion of the picking-shaft is communicated to the picker-stick; but when the picker is not required to act, the jacquard lifts the lid or cap of the clutch-box out of action, and thus the picker remains at rest. The bottom part of the picking-shaft is also provided with a spring-clutch box, which gives way to prevent breakage, in case the picker should strike against the end of the shuttle-boxes. By the above arrangement, the picker may act consecutively on either side of the loom any number of times, as desired.

Fifthly, my improvements also relate to a new form of "frog," which I mount so as to turn on a centre, and I attach to an arm forming the lower part of the "frog," a spring, which keeps it in proper position against a fixed stop; but when the shuttle does not box properly, and the "stop-rod" consequently comes in contact with the "frog," it overcomes the action of the spring, and causes the lower arm of the frog to strike a little lever connected with the motion for stopping the loom; and, at the same time, another part of the frog, coming in contact with the same fixed stop before named, prevents the frog being driven too far back.

Sixthly, my improved "letting-off motion" consists in a double-action V-shaped brake, the two arms of which turn on a common stud or axis, and are of such form as to embrace both sides of a brake-pulley, having a corresponding V-formed periphery fixed on the axis of the warp-beam. Each arm of the brake is attached to a connecting-rod, and these two rods, at their other ends, are fixed to the same lever, in such positions that the motion of this lever tightens or slackens both arms of the brake simultaneously. Tension is given to the warp-threads in the usual way by a weighted lever, fixed at one end of the axis of the yarn or whip-roller, and another small arm is fixed at the opposite end of this axis, which, as the warp is taken up in weaving, acts upon the lever connected with the friction-brake, so as slightly to relieve the beam and unwind the warp, when a spring brings the brake again into action, and holds the warp firmly, as before. A similar V-shaped brake and pulley, worked by the lathe-sword, may also be applied to the axis of the yarn-roller, to hold the warp firmly as the lay beats up the weft.

In order that my invention may be fully understood, and readily carried into effect, I will proceed to describe the drawings hereunto annexed, which represent a loom in which the several improvements above described are embodied.

Figure 2:
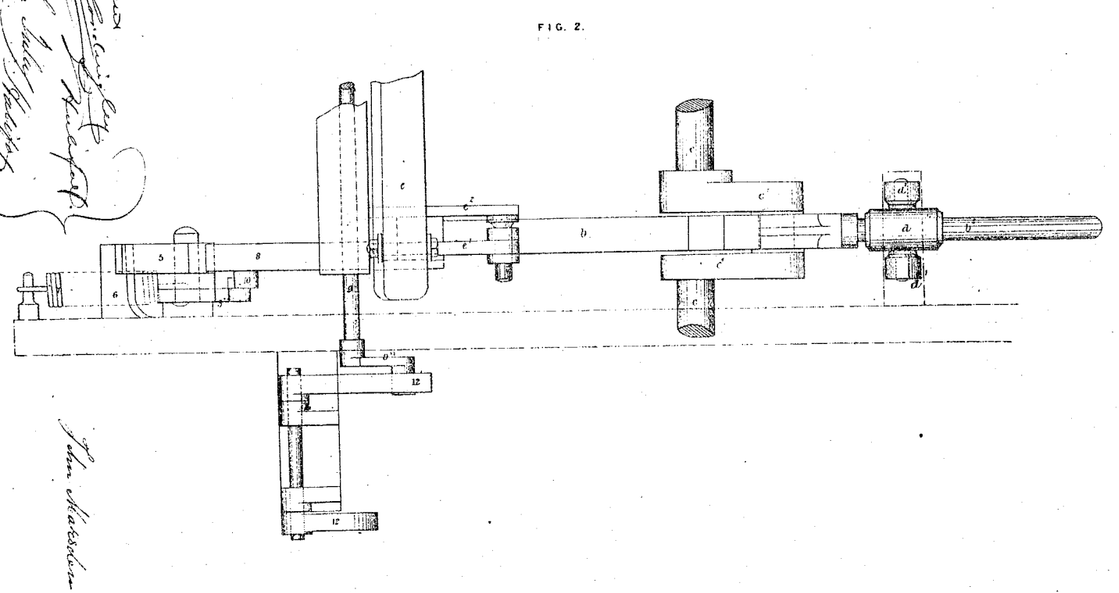
Figure 2, a plan view of these parts of the loom.

The first improvement, which consists in a mode of giving motion to the batten, is most clearly seen on sheets 1 and 2 of the drawings, the batten, and parts in connection therewith, being shown separately on this sheet.

Figure 1 is a side view, and

$a$ is one of the lathe-swords, there being one such sword at each side of the loom, as usual.

To the upper end of each sword is jointed one end of a connecting-rod or arm, $b$, in which is formed a curved slot, $b^1$, to receive the pin of a crank, $c^1$, on the crank-shaft $c$.

The portion of the arm $b$ in which the curved slot is formed, is divided into two parts, bolted together, as clearly seen at fig. 1.

One of the parts is formed in one piece with the end of the arm that is jointed to the lathe-sword, and the other part has attached to it a rod, $b^2$. The rod $b^2$ thus forms a continuation of the connecting-rod, and it is, according to my invention, supported by, and capable of sliding endwise, to and fro, through the tubular guide $d$; and to allow the inclination of the arm to vary as the batten is moved to and fro, the tubular guide $d$ is supported on horizontal axes $d^1$, turning in bearings carried by short projections standing out from the inner side of the framing of the loom.

In figs. 1 and 2 is also shown my improved manner of constructing the batten of a loom, the lathe-sword $a$ being cut away at that part which usually projects above the shuttle-race, and the hand-rail $e$ being supported by rods or studs $e^1$, fixed to curved arms $e^2$, which stand out from the back of the shuttle-race.

$f f$ are fingers jointed to the lathe-swords, and constantly acted on by spiral springs $f^1$, as shown, which are of sufficient strength to cause the fingers to press forward the weft-threads to the fell of the cloth, but which would give way if they came in contact with the shuttle. By this means additional security is obtained in that class of looms in which the shuttle-boxes are detached from the lay, for the prevention of damage to the shuttle when the latter fails properly to enter its box.

At Figure 3, sheets 3 and 4, is shown a side view of the loom;

At Figure 4, sheets 5 and 6, a vertical section; and

At Figure 5, sheet 7, a plan of one side of the same.

Figure 3:
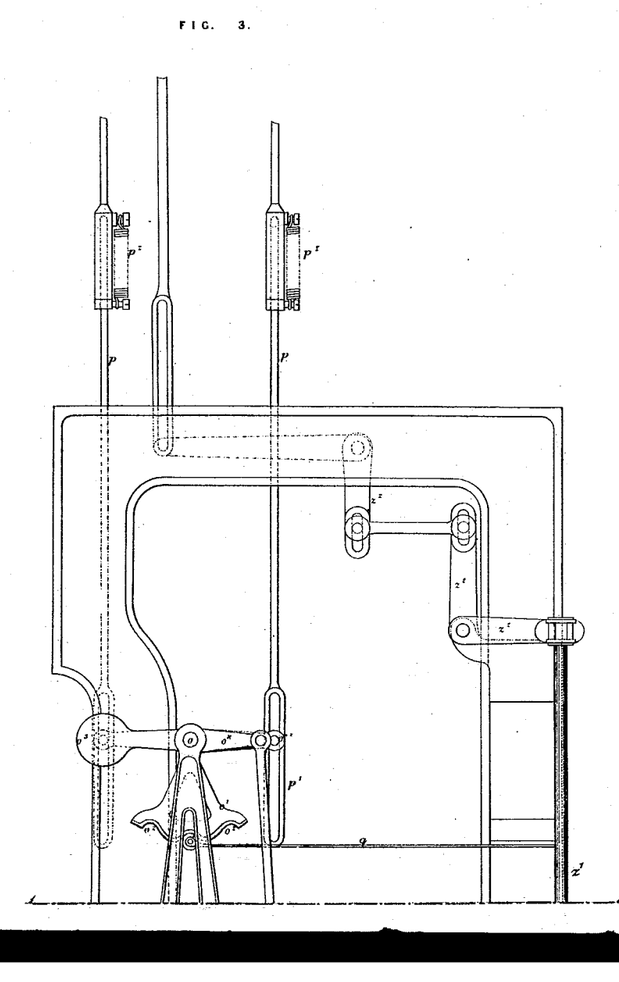
Figure 4:
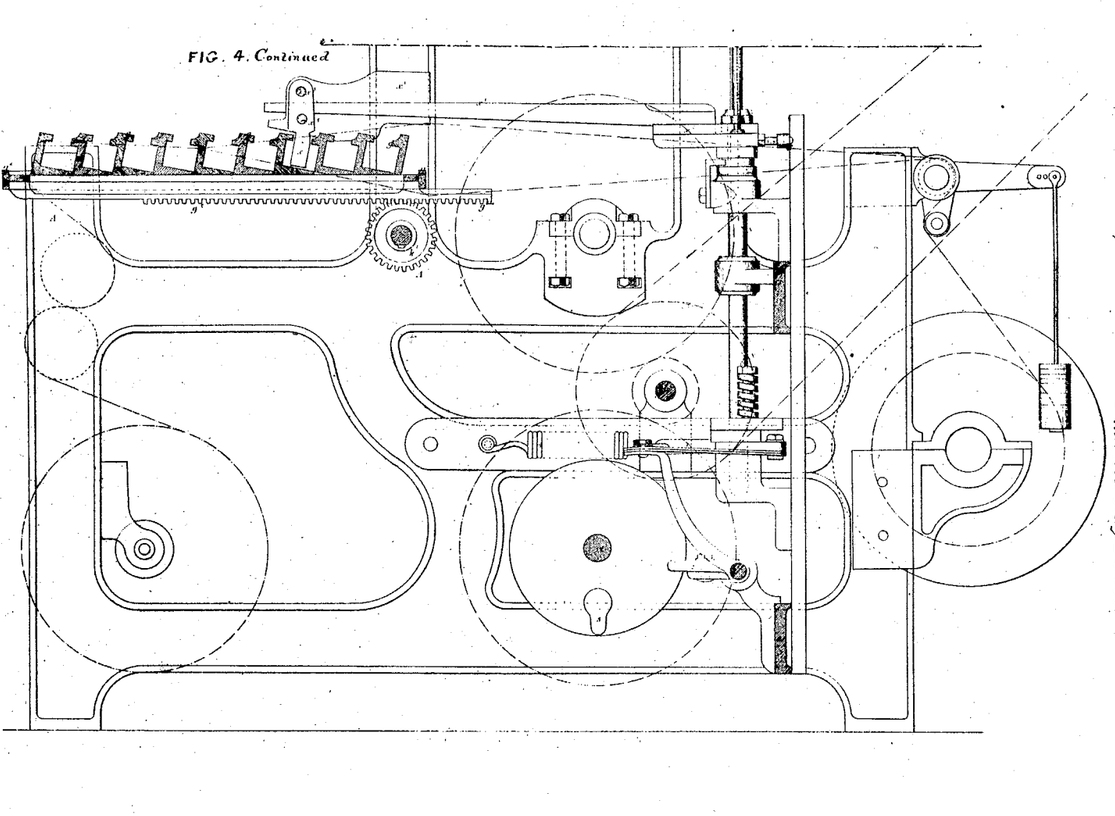
Figure 5:
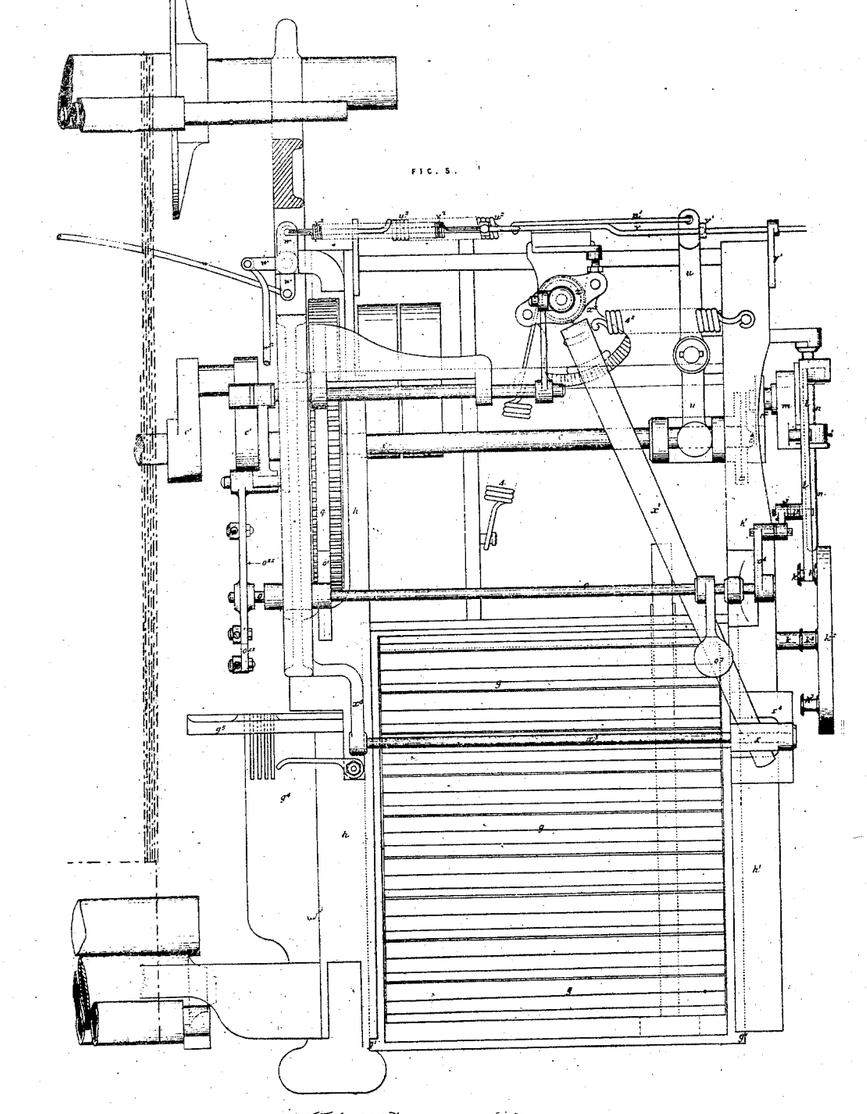

These figures show clearly the manner in which I prefer to carry out the improvements described under the second head of the specification.

In these figures $g\ g$ are the series of shuttle-boxes, there being one such series on each side of the loom. The manner in which each series of shuttle-boxes is formed is most clearly seen in the sectional view of the shuttle-boxes, shown on a larger scale at Figure 6, sheet 8.

Figure 6:
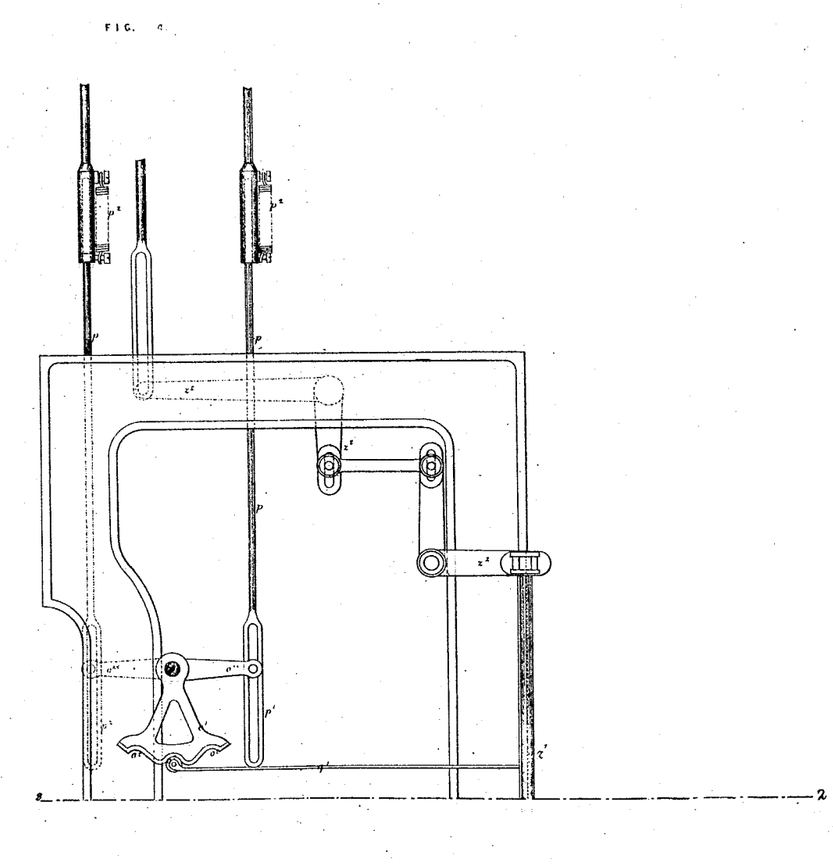

Each box is provided, as is usual, with a shuttle-binder, and is screwed, at its ends, to a metal frame, $g^\times$, which is formed with a feather, $g^1$, projecting from each of its sides.

The feather on the side of the frame which is toward the loom, is received in a groove in a metal bar, $h$, bolted to the standard A of the main framing of the loom, and the feather on the outer side of the frame of boxes is received in a similar groove in a bar, $h^1$, bolted to the top of the outer standard B of the framing.

On the under side of the frame of shuttle-boxes is a rack, $g^2$, into which gears a pinion, $k^1$, on the axis $k$, upon which axis is the pin or stud-wheel $k^2$, so that by turning the pin or stud-wheel, the frame of shuttle-boxes can be moved in either direction required.

$l\ l$ are two catch-levers, formed with forks $l^1$ at their ends, which act on the studs $k^3$ of the stud-wheel $k^2$. The levers $l$, at their opposite ends, are jointed to a sliding frame, $m$, which is formed with four bosses $m^1$, which are suitably bored, to allow of their sliding to and fro on the two parallel rods $n\ n$. These rods are fixed at one end by bolts to a projection standing out from the outer standard B of the framing of the loom.

The frame $m$ has a curved slot, $m^2$, formed in it similar to the curved slot in the connecting-rod or arm of the batten.

In the slot $m^2$ is received the pin of a crank, $c^2$, on the crank-shaft $c$. The arms of this crank are on the same radial line as the arms of the crank $c^1$, so that the sliding frame will be held stationary at the same time as the batten, and during this time the shuttle is thrown as will presently be described.

As soon as the batten commences to move forward, the frame $m$ will likewise move forward, and if either one or other of the forks $l^1$ of the catch-levers $l$ has been brought into a position to take hold of one or other of the studs $k^3$ on the stud-wheel, it will turn the stud-wheel a distance in one or other direction, and then the pinion $k^1$ on the axis of the stud-wheel will traverse the sliding frame $g$ of shuttle-boxes to a distance equal to the width of one box.

The two catch-levers $l$ are connected together by a rod, $l^2$, and by this means the forks $l^1$, at their outer ends, are held at such a distance apart that they cannot both be acting simultaneously on the studs of the stud-wheel.

The lower catch-lever is connected by a rod, $l^3$, to a lever-arm, $o^\times$, on a shaft, $o$. On this shaft are two other arms, $o^{\times\times}$, carrying pins, which pass through slots $p^1$, in rods $p$, passing from the jacquard-apparatus.

The shaft $o$ also carries a curved arc, $o^1$, in which are three notches or recesses $o^2$, into one or other of which the end of the spring-catch $q$ enters. The shaft $o$ can thus be held fast in either of three positions.

$o^3$ is a counterbalance-weight on the shaft $o$.

The rods $p$, which pass to the jacquard, are made in two parts, connected together by a telescopic joint, which is drawn together by a spring, $p^2$, so that if through any error in the jacquard, both rods were caused to act together, no breakage would occur. The working of these rods by the jacquard takes place during the time the sliding frame is at rest.

If the rod $p$, working with the right-hand end of the lever, as seen in fig. 3, be raised by the jacquard, then the catch-levers will both be raised, and will be held up by the spring-catch entering the left-hand notch of the curved arc. When the levers have been raised into this position, the lower catch-lever will, when the frame $m$ is moved forward, take hold of one of the studs on the stud-wheel, and turn the wheel in such a direction that the pinion $k^1$, on its axis, shall shift the frame of shuttle-boxes $g$ a distance equal to the width of one box towards the back of the loom.

If the rod $p$, working with the left-hand end of the lever, in fig. 3, be raised by the jacquard, then the catch-levers would be lowered, and the upper catch-lever would act on the stud-wheel, thereby turning this wheel in a direction to move the frame of shuttle-boxes towards the front of the loom.

If neither of the rods be raised by the jacquard, then neither of the catch-levers will act on the stud-wheel, and the position of the frame of shuttle-boxes will not be shifted.

$m^3$ are stops fixed by bolts to the sliding frame $m$. These stops are for preventing the catch-levers being raised or lowered too far.

If the catch-levers have either been raised or lowered, and so caused, on the forward movement of the frame $m$, to act on the stud-wheel, they will, as the frame $m$ is moved back, be brought back to their original central position, by the inclines $l^1$, on one or other of the catch-levers $l$ being brought against one of the studs on the stud-wheel; the stud-wheel being at this time locked, and prevented from turning by the bolt or catch $r$, which holds the frame of shuttle boxes from moving.

The action of this catch I will now explain.

On the under side of the frame of shuttle-boxes is a notched bar, $g^3$, and when the boxes are to be held fast, the bolt $r$, carried by the framing, is pressed up into one or other of these notches. The bolt $r$, at its lower end, is for this purpose connected to one arm of a lever, $r^1$, the other arm of which is drawn downward by a spring, $s$. This arm also carries a roller, $r^2$, which is acted on by a cam, $t^1$, on the cam-shaft $t$. This cam acts upon the roller $r^2$ just before the time that the shuttle-boxes have to be shifted, and by raising this roller, it withdraws the bolt $r$ from the notched bar $g^3$, and so sets the shuttle-box frame free to be moved in either direction, and this motion is repeated for every revolution of the crank-shaft.

Whenever a change of boxes takes place, and just before the change is fully completed, the cam-surface $t^1$ recedes from the bolt $r^2$, and allows the spring $s$ to raise the bolt $r$ into contact with the notched bar $g^3$, so that immediately one of the notched recesses arrives opposite the bolt, the latter at once locks into it, and prevents the further movement of the boxes.

Figure 7:
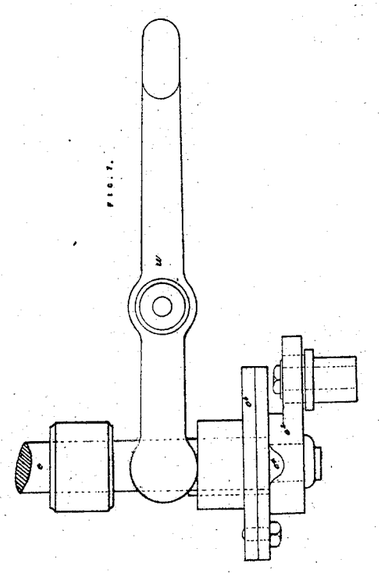
Figure 8:
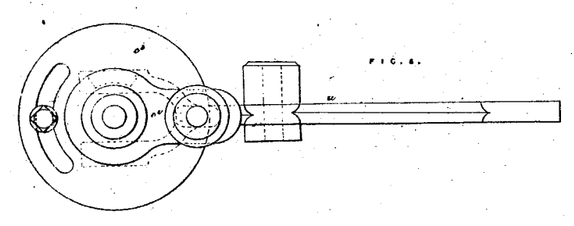

The spring-clutch box, by which the crank-arm $c^2$ is connected with the crank-shaft $c$, and which has to give way whenever the shuttle fails to box properly, is shown separately on a larger scale at Figures 7 and 8, sheet 9.

In these figures $c$ is the end of the crank-shaft, on which is a collar, $c^1$, which can slide endwise on the shaft, but is prevented from turning around it by a feather.

On the collar is a projection, $c^4$, which enters a corresponding recess in the boss of the crank-arm $c^2$. The collar is pressed constantly towards the boss by the lever $u$, which is connected, by means of the rod $u^1$, to one end of a coiled spring, $u^2$, (see fig. 5,) which, at its other end, is fixed to the framing of the loom.

If the shuttle fails to box properly, and projects beyond the end of the shuttle-box, the crank-arm will not turn with the crank-shaft but the collar $c^3$ will be pressed backward, and by overpowering the spring $u^2$, will turn the lever $u$ on its axis.

Near the end of the lever $u$ is a rod, $v$, capable of sliding to and fro through the guides $y^1$ on the framing, and a collar, $v^1$, upon it is constantly drawn against the side of the lever $u$ by a small coil-spring, $v^2$, one end of which is fixed to the rod, and the other to the framing of the loom.

The rod $v$ is connected to one arm of the T-lever $w$, and to the opposite arm of this lever is attached a connecting-rod, $w^1$, which passes near another catch-lever, $u$, on the opposite side of the loom, in a similar manner to that already described in reference to the rod $v$, so that if either of the clutch-levers at one or other side of the loom be turned, the T-lever $w$ will be turned likewise, and the third arm of this lever being connected by the rod $w^2$ with the disengaging-gear of the loom, the loom will at once be stopped.

The engaging and disengaging-gear of the loom is not shown in the drawing, as its construction is well understood.

I will now describe more fully that part of my invention which relates to the picking-motion.

$x^1$ is the picker-staff, bolted to the quadrant $x^2$, the boss of which can turn loosely around the upper end of the picking-shaft $y$, which is supported in suitable bearings bolted to the framing of the loom. The boss of the quadrant can, however, be made fast with the picking-shaft by a clutch, operated by the jacquard.

Figure 9:
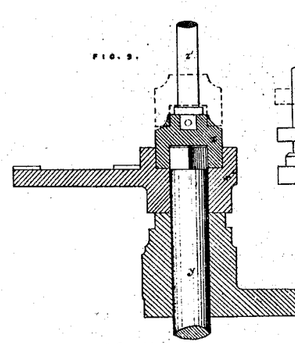
Figure 10:
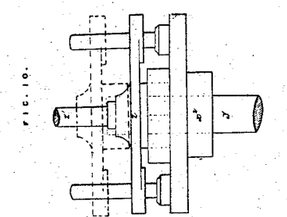
Figure 11:
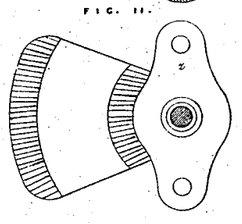

This clutch is shown separately on a larger scale at Figures 9, 10, and 11, sheet 9.

The upper portion of the boss is recessed out in a square form, as seen most clearly in the sectional view, fig. 9, and the end of the picking-shaft, which projects up into this recess, is similarly made square in section, or in place of the end of the shaft and the recess being square, they might be of other form.

$z$ is the lid or cap, which fits over the end of the picking-shaft, and also fits into the recess in the boss $x^2$, so that if the cap be lowered into the recess in the boss, the picker-staff will be made fast on its shaft, and if the cap be raised out of the recess, the picker-staff will be loose on the shaft.

To govern the raising and lowering of the cap, a rod, $z^1$, fixed to the top of the cap, is, by levers $z^2$, connected to the jacquard.

By this arrangement, the order in which the shuttles are thrown from the two sides of the loom is very readily governed, as the picker on either side of the loom may, by the jacquard, be caused to act consecutively for any desired number of times.

The drawings show the pickers $x$ to be each supported by two picker-rods $x^3$, which are above the frames of shuttle-boxes, and are carried at their ends by short standards $x^4$, bolted to the framing of the loom.

In order to prevent breakage, in case the picker should strike against the end of the shuttle-boxes, the picking-shaft has motion transmitted to it through a spring-clutch box.

Figure 12:
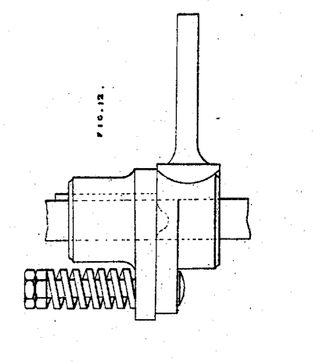

This clutch-box is shown separately on a larger scale at Figures 12 and 13, sheet 10, and is similar to that shown at figs. 7 and 8, except that in this case the two parts of the clutch are drawn together by a coiled spring, in the manner shown in the side view, fig. 12.

The lower half of the clutch (which, if the parts of the clutch are not held together, turns freely around the picking-shaft,) is, by a strap, 1, connected to the longer arm of a lever, 2, the shorter arm of which lever is at intervals struck by a tappet, 3, carried by a disk on the cam-shaft, and thus a partial rotary motion is at intervals given to the lower half of the clutch-box, and this motion is, through the clutch, transmitted to the picking-shaft, but if this shaft is not free to turn, in consequence of the picker having struck against the end of a shuttle-box, then the spring-clutch gives way, and no injury arises.

When the tappet has passed beyond the end of the short arm of the lever 2, the picking-shaft is brought back to its former position by a strap passing from it to a coiled spring, 4, carried by the framing of the loom.

The picker-staff is also similarly drawn back by another spring, $4^x$, connected by a strap to the boss $e^2$.

Figure 14:
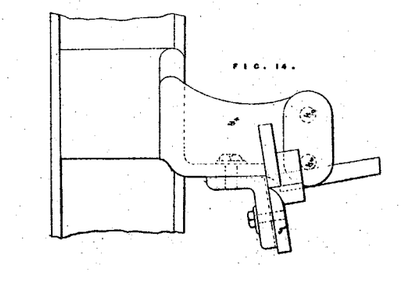
Figure 15:
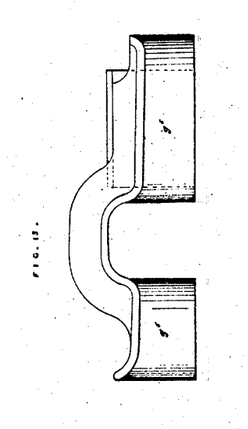
Figure 16:
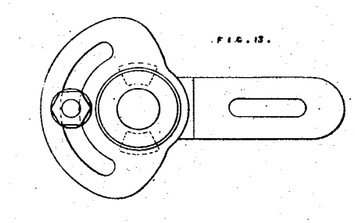

As a shuttle passes across the space between the end of its box and the shuttle-race, it is supported on a plate, $g^4$, which carries the weft-detector, as is usual, and the shuttle is guided correctly into the shed by a plate, $g^5$, which is made adjustable in every direction, as shown in the separate view of these parts at Figures 14 and 15.

My fifth improvement, which relates to a new form of frog, is seen most clearly in figs. 1 and 2, sheets 1 and 2.

5 is the frog mounted on a stud, carried by the framing of the loom.

6 is a fixed stop, which is received in a slot or recess, $5^x$, in the frog, and which limits the distance the frog can be turned in both directions.

$5^{xx}$ is a lever-arm, forming the lower part of the frog, and to the lower end of this lever is attached a coiled spring, 7, which ordinarily holds the lower end of the slot in the frog against the fixed stop 6. If, however, the shuttle fails properly to enter its box, the pawl or stop-rod 8, carried by an axis, 9, passing from side to side of the batten, will engage with the notch in the frog, and when the batten is moved forward, this stop-rod will, by overpowering the spring 7, turn the frog until the top of the slot $5^x$ comes against the fixed stop 6. When the frog is thus turned, the lever $5^{xx}$ strikes against the small lever 10, which, by the rod 11, is connected with the disengaging-gear of the loom, and by turning this lever, the loom is disengaged from the driving-gear, and at once stopped.

If the shuttle properly enters its box at one or other side of the loom, then the stop-rod 8 is, for a time, raised up, so that it shall not act on the notch in the frog, by reason of the shuttle-binder coming against and depressing the upper arm of the lever 12, the lower arm of which lever then presses down a short arm, $9^x$, on the axis of the stop-rod, and so raises and holds up the stop-rod until its forward end has, by the forward movement of the batten, been carried beyond the notch in the frog.

Figure 18:
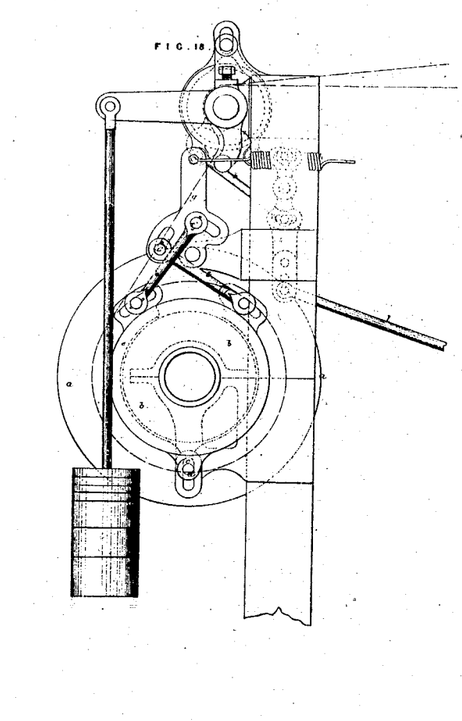
Figure 19:
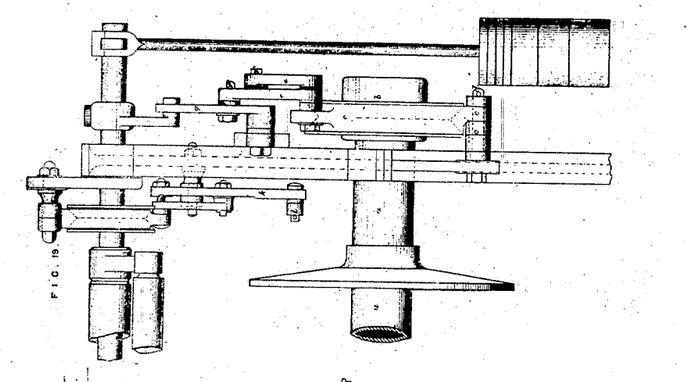

My last improvement, which relates to a let-off motion, is shown at Figures 18 and 19, sheet 11.

In these figures $a$ is the warp-beam, on the axis of which is a brake-pulley, $b$.

$c$ $c$ are two curved arms, both turning on one pin, $d$, below the brake-pulley.

The brake-pulley has a V-groove formed around it, and the curved arms are of a corresponding form.

From the upper ends of these arms, rods $e$ pass to pins $f$, which enter into slots in the lever $g$.

The upper end of the lever is constantly acted on by a coiled spring, $h$, so as to turn the lever into the position shown at fig. 18. The ends of the slots in the lever will then draw upward the rods $e$, attached to the ends of the curved friction-levers, and cause these levers to press against the circumference of the brake-pulley.

When more warp is required, a lever-arm on the axis of the whip-roller, over which the warps pass in the usual manner, comes against the brake-lever arm $g$, and overcoming the spring $h$, turns this arm, and diminishes the friction on the brake-pulley, and so lets off or unwinds a portion of the warp.

A similar brake is applied to the axis of the whip-roller, over which the yarns are led.

The lower end $k$ of the brake-lever of this brake is, by a rod, $l$, connected to the batten, so that, as the batten moves forward to beat up the weft, the brake-lever will be turned, thereby bringing the curved friction-levers in contact with the brake-wheel, and so holding fast the axis of the brake-wheel at the time of the beat-up.

Having thus described the nature of my invention, and the manner of performing the same, I would have it understood that what I claim, is—

1. The combination of the batten of the loom with the slotted connecting-rod, the oscillating guide, and the crank, substantially as before set forth.

2. Also, the combination of the series of traversing shuttle-boxes, with the rack and pinion, the change-wheel, and the reciprocating catch-levers, for moving the change-wheel, according to the indications of the pattern-mechanism, all constructed to operate substantially as before set forth.

3. Also, the combination of the catch-levers, the slotted sliding frame which carries them, the crank, and the spring-clutch box, substantially as before set forth.

4. Also, the combination of the said catch-levers, the slotted sliding frame, the crank, the spring-clutch box, and the stop-motion, substantially as before set forth.

5. Also, the combination of the two catch-levers, the coupling-rod connecting them, the recessed curved arc, and the spring-catch that engages in the recesses of said arc, to hold the levers in the positions determined by the pattern-mechanism, substantially as before set forth.

6. Also, the combination of the catch-levers with the pattern-mechanism, through the intervention of divided connecting-rods, the parts of which are held together by a spring, substantially as before set forth.

7. Also, the combination of the series of shuttle-boxes with the stop for locking said series in the required position, and with the cam, to control said locking, substantially as before set forth.

8. Also, the combination of the instruments for moving the traversing series of shuttle-boxes, with the crank-shaft, through the intervention of the spring-clutch, so as to prevent breakage, in case a shuttle fails to box properly, substantially as before set forth.

9. Also, the combination of the instruments for moving the traversing series of shuttle-boxes, the shaft, for imparting motion to them, the spring-clutch, and the T-shaped lever, connected with the stop-motion of the loom, substantially as before set forth.

10. Also, the combination of the picker-staff, the picking-shaft, the clutch, and the pattern-mechanism, operating said clutch for the purpose of controlling the throwing of the shuttle, substantially as before set forth.

11. Also, the combination of the picker-staff, the picking-shaft, and the spring-clutch, which yields and prevents breakage when the picker-staff strikes the end of a shuttle-box, substantially as before set forth.

12. Also, the combination of the batten of the loom, the stop-rod, the vibratable frog, the spring, and the rod connected with the disengaging-mechanism of the loom, so as to stop the loom in case the shuttle fails to box, substantially as before set forth.

13. Also, the combination of the warp-beam, the brake-pulley, the curved arms, the vibrating brake-lever, and the whip-roller, substantially as before set forth.

JOHN MARSDEN.

Witnesses:
C. CORDINGLEY,
    *Manufacturer's Clerk, Halifax.*
JAMES FAWCETT,
    *Of No. 5 Square, Halifax,*
    *Attorney's Clerk.*